United States Patent
Coimbra et al.

(10) Patent No.: US 11,774,297 B2
(45) Date of Patent: Oct. 3, 2023

(54) TEMPERATURE DETECTION CIRCUIT

(71) Applicant: NXP USA, INC., Austin, TX (US)

(72) Inventors: Ricardo Pureza Coimbra, Campinas (BR); Mateus Ribeiro Vanzella, Campinas (BR); Matheus Silveira Remigio, Campinas (BR)

(73) Assignee: NXP USA, INC., Austin, TX (US)

( * ) Notice: Subject to any disclaimer, the term of this patent is extended or adjusted under 35 U.S.C. 154(b) by 430 days.

(21) Appl. No.: 16/905,433

(22) Filed: Jun. 18, 2020

(65) Prior Publication Data
US 2021/0396597 A1 Dec. 23, 2021

(51) Int. Cl.
*G01K 7/00* (2006.01)
*G01K 7/01* (2006.01)

(52) U.S. Cl.
CPC .................. *G01K 7/015* (2013.01)

(58) Field of Classification Search
CPC ....................................... G01K 7/015
See application file for complete search history.

(56) References Cited

U.S. PATENT DOCUMENTS

| | | | |
|---|---|---|---|
| 5,448,174 A | 9/1995 | Gose et al. | |
| 9,997,254 B2 | 6/2018 | Vilas Boas et al. | |
| 2004/0062292 A1* | 4/2004 | Pennock | G01K 7/015 374/170 |
| 2009/0067471 A1 | 3/2009 | Goto et al. | |
| 2011/0158286 A1* | 6/2011 | Peterson | G01K 7/01 374/170 |
| 2011/0215859 A1* | 9/2011 | Fukami | G05F 3/02 327/512 |
| 2015/0211939 A1* | 7/2015 | Hyun | G01K 7/16 374/183 |
| 2018/0143658 A1* | 5/2018 | McCarthy | G05F 3/30 |
| 2019/0113393 A1* | 4/2019 | Sato | H03K 17/602 |
| 2019/0113946 A1* | 4/2019 | Nicollini | G05F 3/225 |
| 2020/0173862 A1* | 6/2020 | Coimbra | G01K 3/005 |

OTHER PUBLICATIONS

Cartagena, L., "Low Power CMOS Temperature Protection Sensor for Smart Cards", SBMO/IEEE MTT-S International Microwave and Optoelectronics Conference, Aug. 27-30, 2017, IEEE.

* cited by examiner

*Primary Examiner* — Lisa M Caputo
*Assistant Examiner* — Nasir U. Ahmed
(74) *Attorney, Agent, or Firm* — David G. Dolezal

(57) ABSTRACT

A temperature detection circuit includes a first current path and a second current path. The first current path includes a first transistor with a control terminal coupled to receive a reference voltage and includes a temperature sensing device. The second current path includes a second transistor with a control terminal coupled to a node of the first current path. The second current path includes a node that provides an indication of a detected temperature.

21 Claims, 8 Drawing Sheets

TEMPERATURE DETECTION CIRCUIT

BACKGROUND OF THE INVENTION

Field of the Invention

This invention relates in general to temperature detection circuits.

Background

Temperature detection circuits are utilized to provide an indication of a temperature.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

As disclosed in some embodiments herein, a temperature detection circuit includes a first current path and a second current path. The first current path includes a first transistor with a control terminal coupled to receive a reference voltage and includes a temperature sensing device. The second current path includes a second transistor with a control terminal coupled to a node of the first current path. The second current path includes a node that provides an indication of a detected temperature. Providing a temperature detection circuit which such features may in some embodiments, provide for a temperature detection circuit that takes up less space on an integrated circuit and consumes less power.

Figure 1:
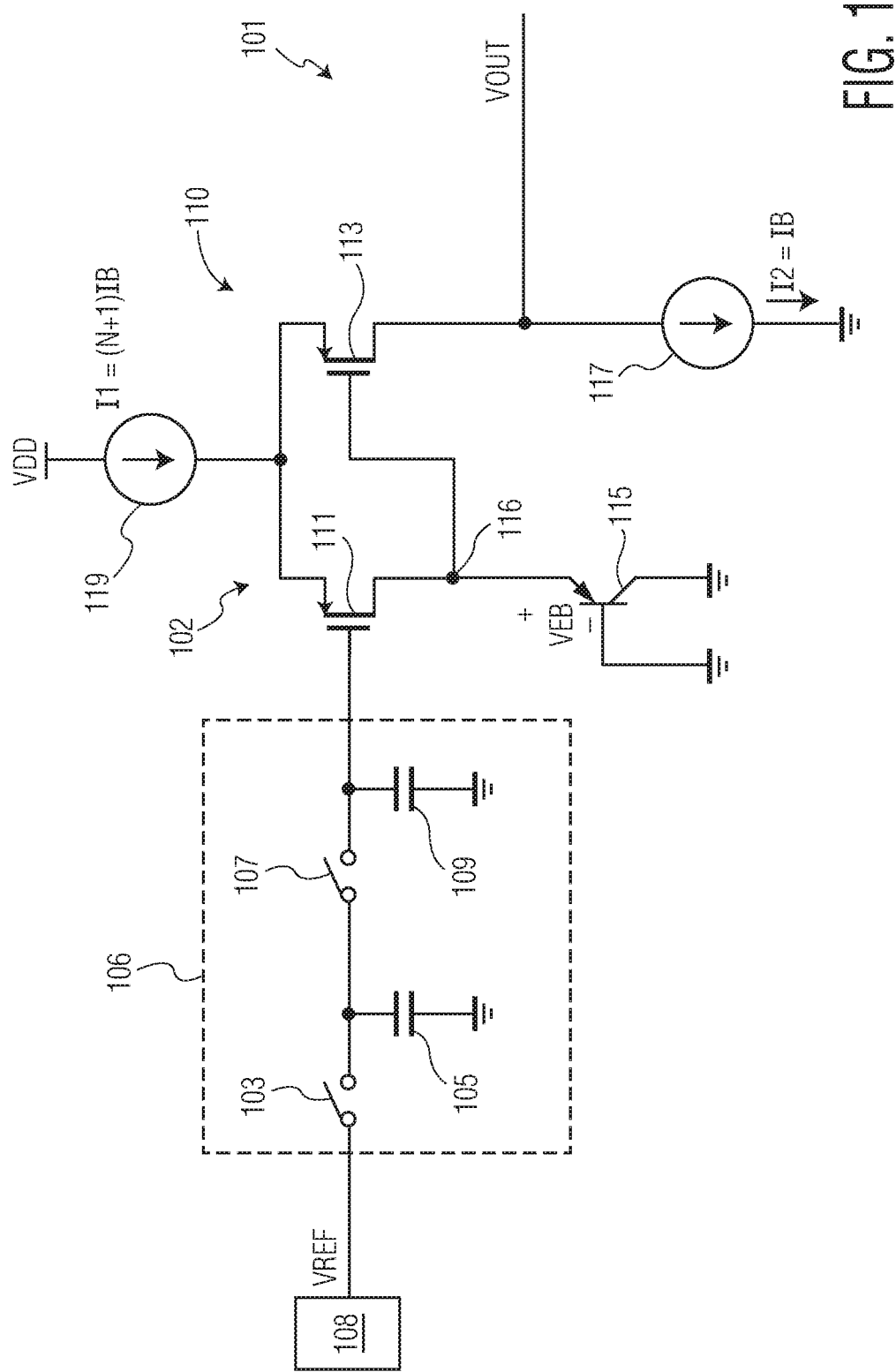
FIG. 1 is a circuit diagram of a temperature detection circuit according to one embodiment of the present invention.

FIG. 1 is a circuit diagram of a temperature detection circuit 101 according to one embodiment of the present invention. Circuit 101 includes a current path 102 and a current path 110. Current path 102 includes a PFET (P-type Field Effect Transistor) 111 and a PNP bipolar transistor 115. In the embodiment shown, transistor 115 is configured in a diode configuration with its base (a control terminal for a bipolar transistor) being grounded. The emitter (a current terminal for a bipolar transistor) is connected to node 116. The collector (a current terminal for a bipolar transistor) is connected ground. In the embodiment shown, the voltage VEB of transistor 115 is sensitive to the junction temperature of transistor 115 with a variation rate typically near −2 mV/° C. The exact value of this rate depends on emitter area and current.

PFET 111 includes a source (a current terminal for a FET) that is connected to current source 119, a drain (a current terminal for a FET) that is connected to node 116, and a gate (a control terminal for a FET) that is connected to a switching capacitor circuit 106 that samples a reference voltage VREF to provide to the gate of PFET 111.

In the embodiment shown, switching capacitor circuit 106 includes two capacitors 105 and 109 that are for holding a sampled reference voltage. Circuit 106 includes switch 103 for coupling capacitor 105 to reference circuit 108 during a sampling phase and includes switch 107 for coupling capacitor 109 to reference circuit 108 during a sampling phase. During a sampling phase when switches 103 and 107 are closed, capacitors 105 and 109 are charged to store the reference voltage (VREF). When the sampling phase is over, switches 103 and 107 open.

The gate of PFET 111 is biased at the sampled voltage stored on capacitor 109. In the embodiment shown, the sampled voltage on capacitor 105 reduces the discharge of capacitor 109 due to leakage current through switch 107 which is open. Other embodiments may utilize a different type of sample and hold circuit. For example, some embodiments may not include capacitor 105. In still other embodiments, the gate of PFET 111 would be connected directly to reference circuit 108. In one embodiment, reference circuit 108 is a bandgap reference circuit to provide voltage VREF. However, reference circuit 108 may be another type of reference circuit in another embodiment.

Current path 110 includes PFET 113 whose source is connected to current source 119. The drain of PFET 113 is connected to current source 117 at the output node (VOUT) of circuit 101. The state of VOUT provides an indication of whether the temperature is greater than or less than the detected temperature.

The indication provided by VOUT may be used by a number of different types of circuits for a number of different applications. For example, the temperature indication can be used for automotive, industrial, commercial, or residential applications. In some embodiments, the detected temperature is in the range of −30 to 85° C., but the detected temperature may be of other values in other embodiments.

Current source 119 is configured to provide current to both paths 102 and 110 during operation. Source 119 is configured to source a larger amount (N+1)IB of current than is sunk by current source 117 (IB). In one embodiment, N is equal to 1, but may be of other values in other embodiments. In one embodiment, IB is in the tens of nanoamperes range, but may be of other values in other embodiments. In one embodiment, PFET 111 and PFET 113 are sized with width/length ratios proportional by a factor of N such that the current through path 102 is equal to the current through path 110 times N when the source-gate voltage of PFETS 111 and 113 are equal.

In one embodiment, IB, N, VREF, and the size of transistor 115 are set such that when the junction temperature of transistor 115 is equal to the detected temperature where transistor 115 is biased with an emitter current equal to N*IB, the voltage VEB of transistor 115 is equal to VREF and VOUT is equal to VEB.

The following equations set forth one example of a relationship of the parameters of transistor 115 for the value constraints described in the previous paragraph. $I_C$ and $I_E$ are the collector and emitter currents, respectively, of transistor 115 when the gate-source voltages of PFET 111 and 113 are equal ("at threshold"), T is the junction temperature of transistor 115, β is the Beta factor of transistor 115, k is Boltzmann's constant, $T_{DET}$ is the detected temperature, $I_S$ is the saturation current, and q is the elementary charge.

$$VEB = \frac{kT}{q} \ln\left(\frac{I_c}{I_s}\right) \quad \text{Equation 1}$$

$$VREF = VEB \text{ (at threshold)} \quad \text{Equation 2}$$

$$I_E = NIB \text{ (at threshold)} \quad \text{Equation 3}$$

$$I_C = \frac{\beta}{(\beta+1)} \cdot I_E \quad \text{Equation 4}$$

$$T_{DET} = \frac{q \cdot VREF}{k \cdot \ln\left(\frac{\beta}{(\beta+1)} \frac{NIB}{I_s}\right)} \quad \text{Equation 5}$$

The detected temperature can be adjusted by changing the value of VREF, bipolar transistor size, N, and/or IB In one embodiment, for a detected temperature of 125° C., VREF is set to 0.4V. However, the detected temperature and VREF may have other relationships in other embodiments.

Figure 2:
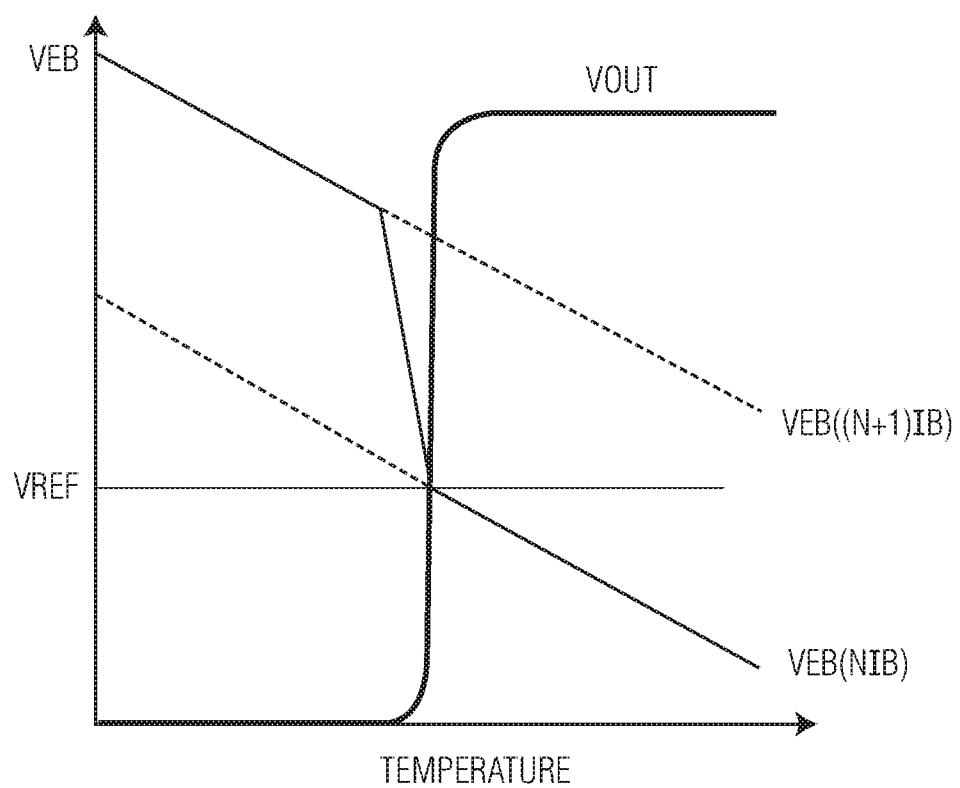
FIG. 2 is a graph showing a voltage versus temperature relationship of a temperature detection circuit according to one embodiment of the present invention.

FIG. 2 shows a voltage to temperature graph which illustrates the operation of temperature detector circuit 101. As shown in FIG. 2, the emitter base voltage (VEB) of transistor 115 generally falls inversely as the temperature rises. In the embodiment shown, the voltage VEB of transistor 115 is sensitive to the junction temperature of transistor 115 with a variation rate typically near −2 mV/° C. The exact value of this rate depends on emitter area and current. The detected temperature is labeled as TEMP on the temperature line in FIG. 2.

Referring back to FIG. 1, when the temperature is below the detected temperature, VEB is above VREF. Accordingly, at this time, the source to gate voltage of PFET 111 is higher than the source to gate voltage of PFET 113 wherein the current from current source 119 flows mainly through current path 102. As the temperature rises, VEB falls inversely with the rising temperature at a rate (see FIG. 2) that corresponds to current of current source (N+1)IB in the current (N+1)IB serves as the emitter biasing current for transistor 115 during this temperature range. During this time, current source 117 is "starved" of current because PFET 113 is not conducting. Current source 117 being starved of current pulls VOUT to ground.

As the temperature rises closer to detected temperature, PFET 113 begins to conduct and more current from current source 119 flows through path 110. At this point, VEB falls at a greater rate until the current conducted by PFET 113 reaches IB causing current source 117 to come out of "starvation" and VOUT to rise. When the temperature reaches the detected temperature, VEB equals VREF and the gate to source voltage of PFET 111 equals the gate to source voltage of PFET 113. At this time, both transistors 111 and 113 are in saturation where current N*IB flows through path 102 and current IB flows through path 110. With PFET 113 in saturation and current IB flowing through path 110, current source 117 is no longer starved and the voltage of VOUT is pulled to toward a midpoint in that PFET 113 is providing an equal amount of current that current source 117 is sinking.

As the temperature rises slightly above the detected temperature (TEMP), the gate-source voltage of transistor 113 is greater than the gate-source voltage of transistor 111 which causes PFET 113 to pull the voltage of VOUT to a high level such that PFET 113 becomes "starved" where it operates in the triode region to conduct current IB. As the temperature rises further, VEB decreases at approximately a rate that corresponds to a current of N*IB in that N*IB is approximately the emitter biasing current through transistor 115. In some embodiments, providing a temperature sensing device (transistor 115) with different emitter biasing currents ((N+1)IB, N*IB) above and below the detected temperature may improve the performance of the temperature detection circuit in that is sharpens the transition of VOUT and improves noise rejection. In the embodiment shown, the different emitter currents during operation are implemented by providing a sinking current source 117 in current path 110 that is starved when VEB is above VREF.

As the temperature falls from above the detected temperature to below the detected temperature, VEB rises until VEB is greater than VREF which reduces the conductivity of PFET 113 until it conducts less than IB to starve current source 117 to pull VOUT to ground.

Figure 3:
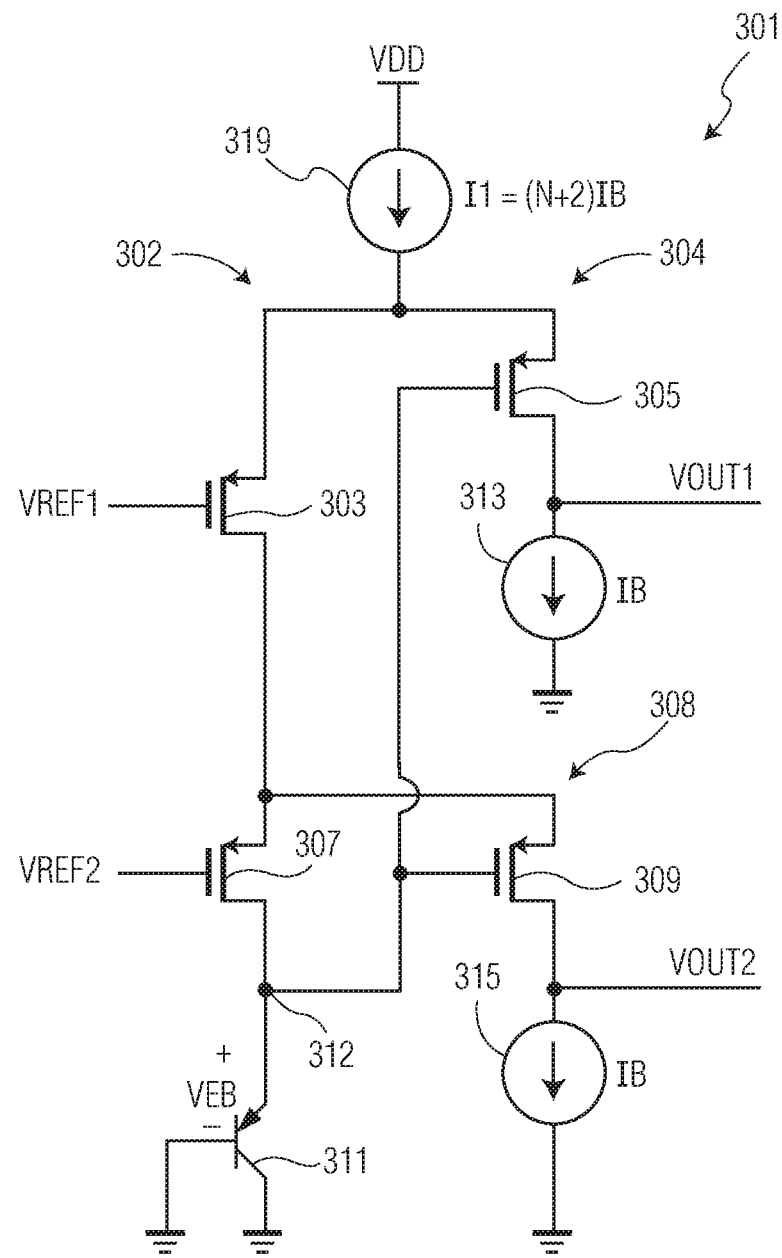
FIG. 3 is a circuit diagram of a temperature detection circuit according to another embodiment of the present invention.

FIG. 3 is a circuit diagram of a temperature detection circuit according to another embodiment of the present invention. Circuit 301 includes a current source 319, a first current path 302, a second current path 304, and a third current path 308. Circuit 301 includes two outputs VOUT1 and VOUT2 for providing indications of whether the temperature is above or below two different temperatures. Path 302 includes PFET 303, PFET 307 and a diode configured PNP bipolar transistor 311. The gate of PFET 303 is biased at VREF1 and the gate of PFET 307 is biased at VREF2.

Path 304 includes PFET 305 and current source 313. Path 304 includes an output VOUT1 to provide an indication of whether the temperature is above a detected temperature (TEMP1). Path 308 includes PFET 309 and current source 315. Path 308 includes an output VOUT2 to provide an indication of whether the temperature is above another detected temperature (TEMP2). The gates of each of PFETs 305 and 309 are biased by node 312 which is at voltage VEB of transistor 311. In the embodiment shown, current sources 313 and 315 each sink current IB and current source 319 sources a current (N+2)IB. In the embodiment shown, current sources 313 and 315 provide the same amount of current. However, in other embodiments, current sources 313 and 315 may provide different current values. In one embodiment, PFETs 305 and 309 are of the same size, but may be of different sizes in other embodiments.

In the embodiment shown, VOUT1 corresponds to the lower temperature (TEMP1) of the two detected temperatures and VOUT2 corresponds to a higher temperature (TEMP2) of the two detected temperatures. VREF1 is set to match VEB of transistor 311 at TEMP1 and VREF2 is set to match VEB of transistor 311 at TEMP2. In the embodiment shown VREF1 is higher than VREF2 in that VEB of transistor 311 decreases as the temperature rises In one embodiment, VREF1 is 0.76V for TEMP1 of −40° C., and VREF2 is 0.4V for TEMP2 of 125° C., but these may be of other values in other embodiments.

When the temperature is below TEMP1 and TEMP2, VEB is above both VREF1 and VREF2. Therefore, neither of PFETs 305 and 309 are conductive. In this temperature range, both current sources 313 and 315 are starved to pull VOUT1 and VOUT2 to ground respectively. In this temperature range, current (N+2)IB flows through PFET 303, PFET 307, and transistor 311, where current (N+2)IB is the emitter biasing current for transistor 311.

When the temperature is above TEMP1 and below TEMP2, VEB is less than VREF1 and greater than VREF2. Accordingly, the gate-source voltage of PFET 305 is higher than the gate-source voltage of PFET 303 where PFET 305 is in triode operation and where current source 313 is no longer in starvation to pull the voltage of VOUT1 high to indicate that the temperature is above TEMP1. PFET 305 is starved such that the current IB flows through path 304. Also, in this range, VEB is higher than VREF2 where transistor 309 is not conductive and current source 315 is starved where VOUT2 is at a low voltage to indicate that the temperature is below TEMP2. In this range, current (N+1)IB flows through PFET 303, PFET 307, and transistor 311 and is the biasing emitter current for transistor 311.

When the temperature is above both TEMP1 and TEMP2, VEB is below both of VREF1 and VREF2. The gate-source voltage of PFET 305 is greater than the gate-source voltage of PFET 303, and the gate-source voltage of PFET 309 is greater that the gate-source voltage of PFET 307. Accordingly, both PFETs 305 and 309 are in triode operation to where current source 313 and current source 315, respectively, are not in starvation to pull nodes VOUT1 and VOUT2 high, respectively, to indicate that the temperature is above both TEMP1 and TEMP2, respectively. Because both PFETs 305 and 309 are in starvation, the current through each of current paths 304 and 308 is IB. The current through PFET 303 is (N+1)IB. The current through PFET 307 and transistor 311 is N*IB, which is the emitter biasing current for transistor 311 in this range.

Figure 5:
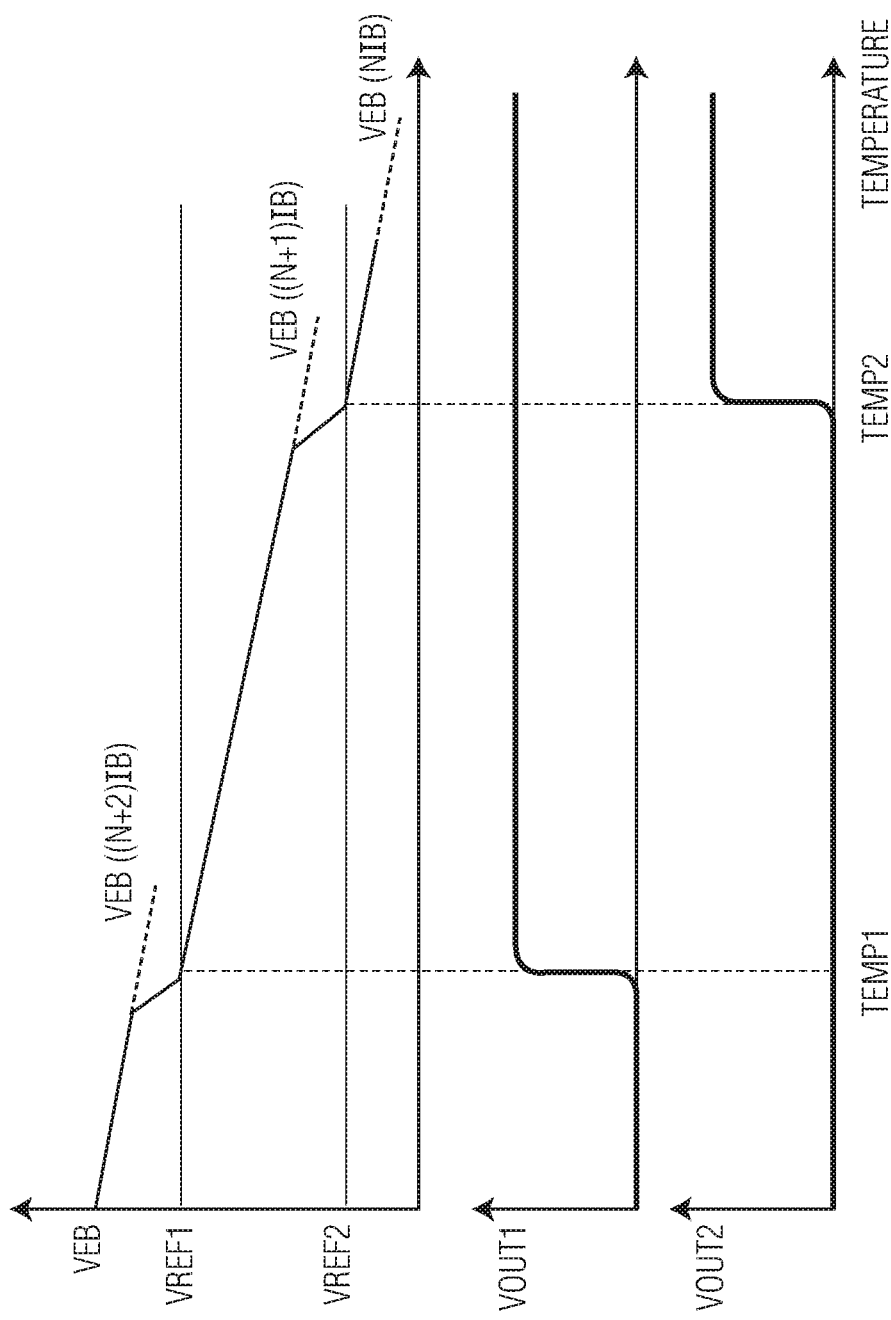
FIG. 5 is a graph showing a voltage versus temperature relationship of a temperature detection circuit according to another embodiment of the present invention.

FIG. 5 is a voltage versus temperature graph illustrating the operation of circuit 301 of FIG. 3. As shown in FIG. 5, when the temperature is below TEMP1 and TEMP2, both of VOUT1 and VOUT2 are at low voltage states. Also, in this range, VEB changes inversely with temperature generally at a rate corresponding to (N+2)IB, which is the emitter bias current of transistor 311 in this range.

When the temperature is above TEMP1 and below TEMP2, VOUT1 is at a high voltage state and VOUT-2 is at a low voltage state. VEB changes inversely with temperature generally at a rate corresponding to (N+1)IB, which is the emitter bias current of transistor 311 in this range.

When the temperature is above both TEMP1 and TEMP2, both VOUT1 and VOUT2 are at a high voltage state. VEB changes inversely with temperature generally at a rate corresponding to N*IB, which is the emitter bias current of transistor 311 in this range.

In one embodiment of circuit 301, the TEMP1 is 30° C. and TEMP2 is 90° C. However, these temperatures may be of other values in other embodiments. In some embodiments of FIG. 3, TEMP1 has to be lower than TEMP2 by a certain amount in that VREF1 needs to be greater than VREF2 by at least a certain amount (e.g. 150 millivolts).

Figure 4:
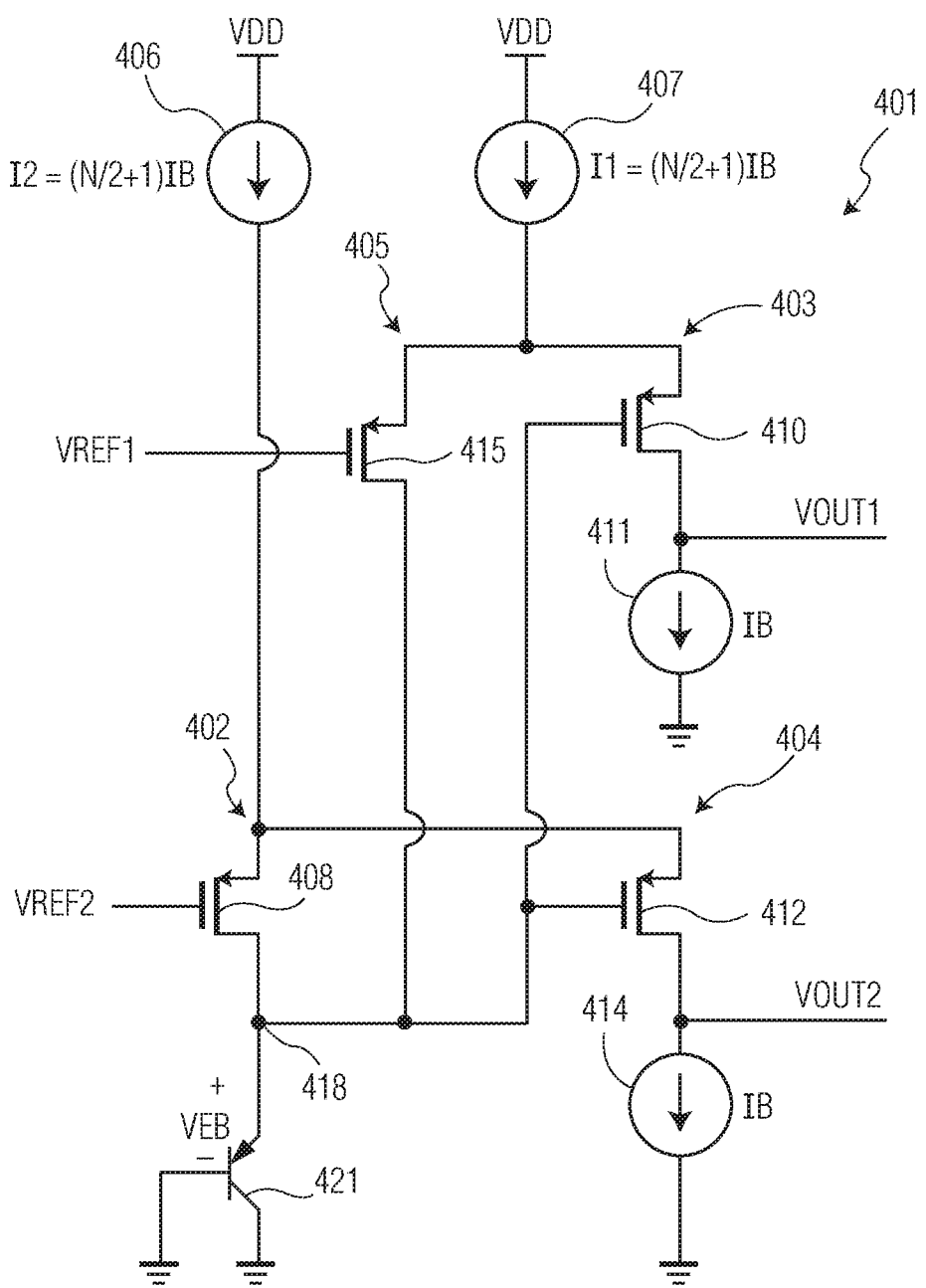
FIG. 4 is a circuit diagram of a temperature detection circuit according to another embodiment of the present invention

FIG. 4 is a circuit diagram of a temperature detection circuit 401 according to another embodiment of the present invention. Circuit 401 includes a current path 402 that includes PFET 408 and diode configured PNP transistor 421. Current path 405 includes PFET 415 and joins with current path 402 at node 418. Current path 403 includes PFET 410 and current source 411. Current path 403 includes an output (VOUT1) for providing an indication of a detected temperature (TEMP1). Current path 404 includes PFET 412 and current source 414. Current path 404 has an output (VOUT2) for providing an indication of a detected temperature (TEMP2). Current source 406 is configured to provide current to current paths 402 and 404 (and biasing current for transistor 421). Current source 407 is configured to provide current to current path 405 and 403 (and biasing current for transistor 421). VREF1 is set to equal the VEB of transistor 421 when the temperature is at detected temperature TEMP1. VREF2 is set to equal the VEB of transistor 421 when the temperature is at detected temperature TEMP2.

Like the circuit of FIG. 3, detection circuit 401 provides indications (VOUT1 and VOUT2) of two detected temperatures (TEMP1 and TEMP2). However, unlike the circuit of FIG. 3, each current path (403 and 404) that includes a temperature indication output (VOUT1 and VOUT2, respectively) has their own sourcing current source (407 and 406, respectively) for sourcing current to the current path (403 and 404) and to the PFET (PFET 415 and PFET 408, respectively) that receives the reference voltage (VREF1 and VREF2, respectively) corresponding to the temperature (TEMP1 and TEMP2, respectively) detected by the path. In contrast, the circuit of FIG. 3 has only one such current source (current source 319) for sourcing current. In the embodiment of FIG. 4 where each current source 411 and 414 is IB, each of current sources 406 and 407 provides a current of (N/2+1)IB.

With the circuit of FIG. 4, either of TEMP1 or TEMP2 can be the higher detected temperature. However, for the embodiment whose operation is described below, VREF2 is set to a lower voltage than VREF1 to make TEMP2 a higher detected temperature than TEMP1.

When the temperature is less than TEMP1 and TEMP2, VEB is higher than both VREF1 and VREF2 such that neither of PFETs 410 or 412 are conductive. In this temperature range, both current sources 411 and 414 are starved to pull VOUT1 and VOUT2 to ground, respectively. Also, in this range, the current from both current sources 406 and 407 flows through transistor 421 which provides an emitter biasing current of (N+2)IB for transistor 421.

When the temperature is higher than TEMP1 and lower than TEMP2, VEB is lower than VREF1 and the gate-source voltage of PFET 410 is higher than the gate-source voltage of PFET 415. In such a condition, PFET 410 is conducting where current source 411 is not starved and VOUT1 is pulled high to indicate that the temperature is above TEMP1. In this temperature range, VEB is higher than VREF2 such that PFET 412 does not conduct wherein current source 414 is starved such that VOUT2 is at a low voltage state. Because PFET 410 is conductive and is in starvation, current IB flows through PFET 410, with the remaining current from current source 407 (approximately N/2IB) flowing through PFET 415 and transistor 421. Because PFET 412 is nonconductive, nearly all of the current from current source 406 ((N/2+1)IB) flows through PFET 408 and transistor 421. Accordingly, in this temperature range, the emitter bias current for transistor 421 is approximately (N+1)IB.

When the temperature is higher than both TEMP1 and TEMP2, VBE is lower than both VREF1 and VREF2 wherein the gate-source voltage of PFET 403 is higher than PFET 415 and the gate-source voltage of PFET 412 is higher than PFET 408. Accordingly, PFET 410 is conducting and current source 411 is not in starvation to pull VOUT1 to a high voltage state, and PFET 412 is conducting and current source 414 is not in starvation to pull VOUT2 to a high voltage state. Because current IB is flowing through both PFET 410 and PFET 414, current (N/2)*IB flows through PFET 415 from current source 407 and current (N/2)*IB flows through PFET 408 from current source 406 where the emitter bias current through transistor 421 is N*IB.

The operational voltages of circuit 401 is also shown by the voltage to temperature graph of FIG. 5. Because in FIG. 4, each output current path (403 and 404) has its own sourcing current source (407 and 406, respectively), the detected temperatures (TEMP1 and TEMP2) can be closer together than with the circuit of FIG. 3.

The circuits shown in FIGS. 3 and 4 can each include other features, devices or have other configurations in other embodiments. For example, the circuits of FIGS. 3 and 4 can be modified to include a greater number of detected temperatures. As one example of such a modification, referring to FIG. 4, a third current path (not shown but similar to current path 403) having an output to detect a third temperature may be added to circuit 401 wherein the third current path includes a PFET (not shown but similar to PFET 410) with its gate connected to node 418 and a sinking current source (not shown but similar to current source 411) connected to the PFET at the output node. The source of this PFET would be connected to a third sourcing current source (not shown but similar to current source 407). The third sourcing current source would be coupled to node 418 with a PFET (not shown but similar to PFET 415) whose gate is coupled to receive a third reference voltage corresponding to the third detected temperature.

Figure 6:
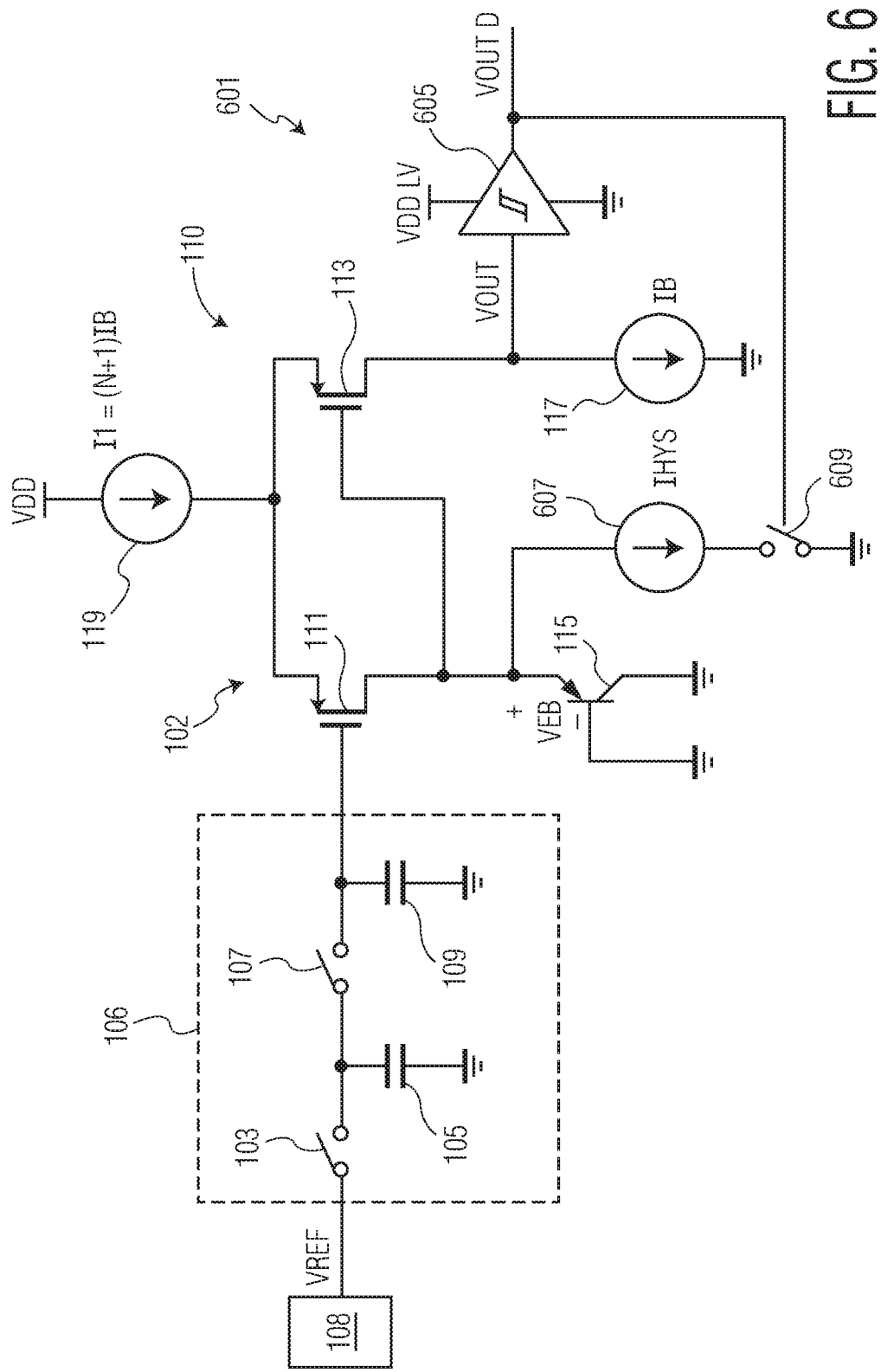
FIG. 6 is a circuit diagram of a temperature detection circuit according to another embodiment of the present invention.

FIG. 6 is a circuit diagram of a temperature detection circuit 601 according to another embodiment of the present invention. Circuit 601 is similar to circuit 101 of FIG. 1 where devices having the same reference numbers in FIG. 6 are similar to the devices in FIG. 1.

Circuit 601 of FIG. 6 differs from circuit 101 of FIG. 1 in that it includes circuitry for providing hysteresis to the indication (VOUT) of the detected temperature. In the embodiment shown, circuit 601 includes an additional sinking current source 607 that is activated by closed switch 609 when VOUT is at a high voltage level state to reduce the amount of emitter bias current of transistor 115 by IHYS. Thus, when VOUT is high (and current IB is flowing through PFET 113), the emitter bias current through transistor 115 is reduced by IHYS to (N*IB-IHYS) due to current source 607.

Figure 8:
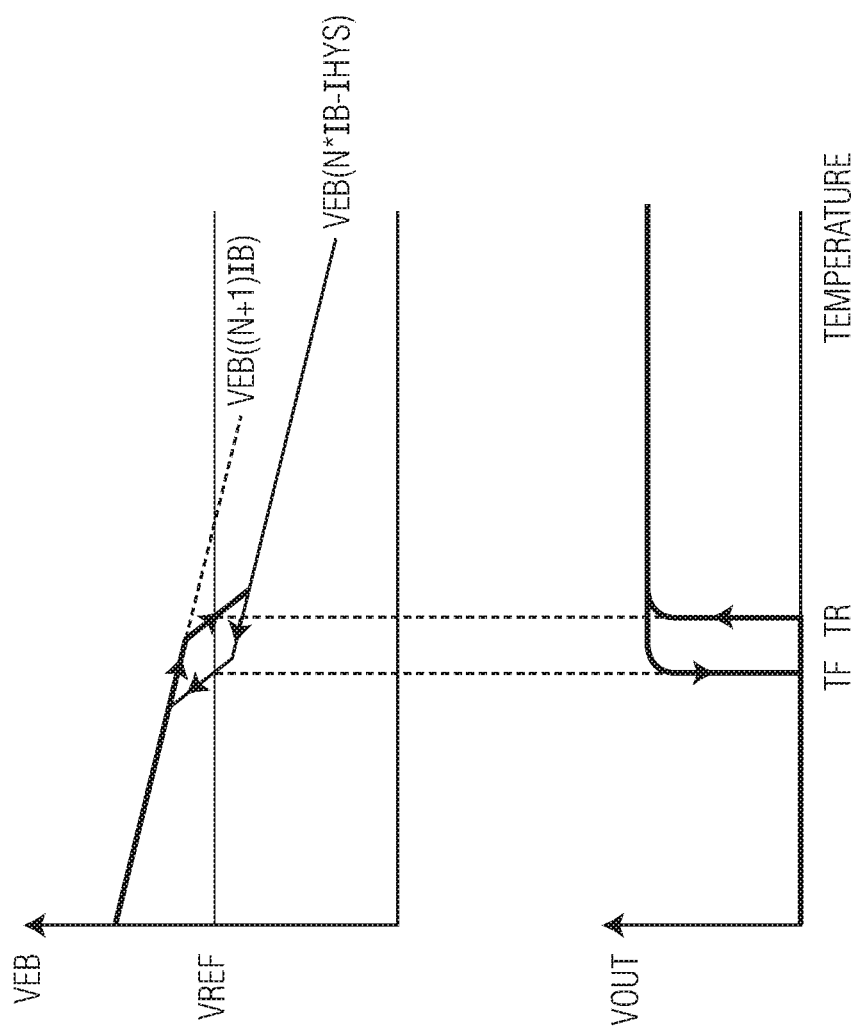
FIG. 8 is a graph showing a voltage versus temperature relationship of a temperature detection circuit according to another embodiment of the present invention.

Reducing the amount of emitter bias current when VOUT is high lowers VEB from what it would be if current source 607 were not activated. Accordingly, when VOUT is high, the temperature has to fall to a lower level for VOUT to go to a low voltage state from a high voltage state than the level that the temperature has to rise for VOUT to go to a high voltage state from a low voltage state. This hysteresis in VOUT is shown in the voltage to temperature diagram of FIG. 8 where the temperature (TR) (where VOUT transitions from a low voltage state to a high voltage state) is higher than the temperature (TF) (where VOUT falls from a high voltage state to a low voltage state). In one embodiment, the amount of hysteresis is dependent upon the amount of current IHYS versus current IB. In one embodiment, IHYS is 50% of IB, but may be of other values in other embodiments. In other embodiments, hysteresis can be provided by other ways including selectively activating a current source between VDD and the emitter terminal of transistor 115 when VOUT is low.

Referring back to FIG. 6, in the embodiment shown, circuit 601 includes a Schmitt trigger buffer 605 that acts to level shift the high voltage state level of VOUT to a lower logic level (VDD LV) to produce VOUT D that can be used to provide the indication to lower voltage logic or processing circuitry (not shown). In the embodiment shown, VOUT D is also used to control switch 609. In one embodiment, VDD is 3 volts and VDD LV is 1.0 Volts, but these may be of other values in other embodiments. In one embodiment, this may be advantageous where the source voltage of PFET 113 is greater than VDD LV. Other embodiments may include another type of level shift circuit in place of buffer 605.

Figure 7:
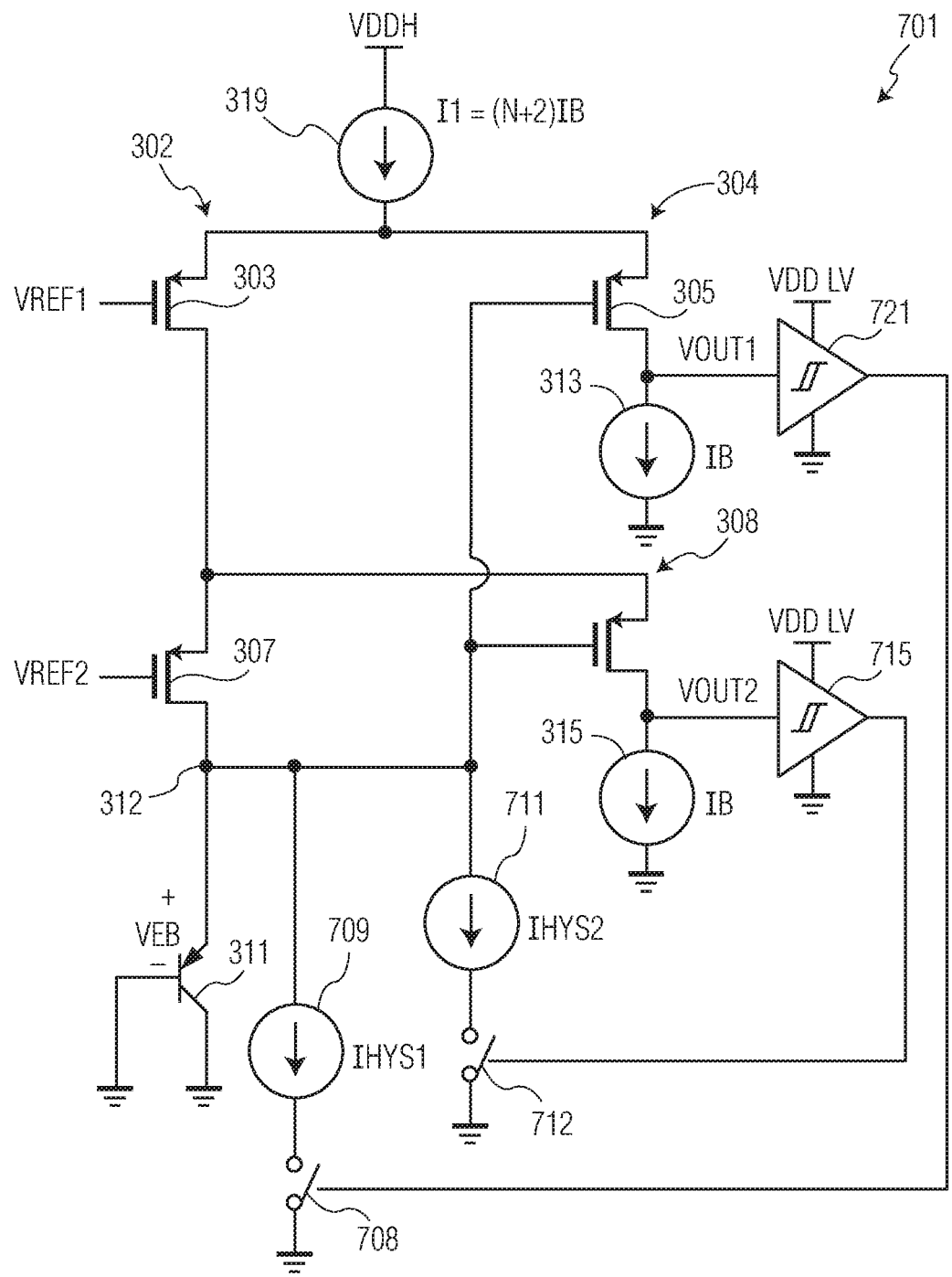
FIG. 7 is a circuit diagram of a temperature detection circuit according to another embodiment of the present invention

FIG. 7 is a circuit diagram of a temperature detection circuit 701 according to another embodiment. Detection circuit 701 sets forth an example of how hysteresis can be provided to each output of a circuit that detects multiple temperatures. Circuit 701 is similar to circuit 301 of FIG. 3 where similar devices have the same reference numbers. In addition, circuit 701 includes circuitry (similar to the circuitry in FIG. 6) for providing hysteresis for each output (VOUT1 and VOUT2).

When VOUT1 is at a high voltage state, current source 709 is activated (by closed switch 708) to reduce the emitter bias current through transistor 311 by current IHYS1. Thus, the temperature that causes VOUT1 to go from a low voltage state to a high voltage state is higher than the temperature that causes VOUT1 to go from a high voltage state to a low voltage state.

When VOUT2 is at a high voltage state, current source 711 is activated (by closed switch 712) to reduce the emitter bias current through transistor 311 by current IHYS2. Thus, the temperature that causes VOUT2 to go from a low voltage state to a high voltage state is higher than the temperature that causes VOUT2 to go from a high voltage state to a low voltage state.

Circuit 701 also includes Schmidt trigger buffers 721 and 715 for reducing the high voltage state for signals VOUT1 and VOUT2 respectively to VDD LV. FIG. 4 can also be modified to provide hysteresis to VOUT1 and VOUT2 as well.

The switches shown in the figures (e.g. switches 103, 708) may be implemented with a number of switching devices such as e.g. bipolar transistors, MOSFETS, pass gates, etc.

As used herein, a temperature sensing device is a device that is biased by a current and produces a voltage that is sensitive to temperature. Other types of temperature sensing devices include for example, other types of diode circuits (including diode configured MOSFETs, diodes), one or more bipolar transistors (e.g. a Darlington configuration), and temperature sensitive resistors.

Utilizing a diode connected bipolar transistor for a temperature sensing device may provide for a temperature sensing device with improved temperature sensitivity. However, other types of temperature sensing devices (including other types of diode circuits) may be utilized in other embodiments.

The circuitry, features, and/or methods described with respect to one embodiment may be implemented with the circuitry, features, and/or methods of the other embodiments. For example, a sample and hold circuit similar to sample and hold circuit 106 in FIG. 1 may be implemented for sampling VREF1 and VREF2 in FIG. 3 and FIG. 4.

In one embodiment, providing a temperature detection circuit that includes two current paths where one current path includes a transistor receiving a reference voltage and temperature sensing device that sets a voltage for a control terminal of a second transistor of the second current path that provides the output indicative temperature may, in some embodiments, provide for a more compact temperature detector that consumes less power. With embodiments described herein, the temperature sensing device is included in the current path with the transistor receiving the reference voltage, thereby reducing the complexity of the comparison function.

In one example of a simulation of an embodiment (not shown) similar to FIG. 3, the maximum current consumption of the circuit was less than 65 nA and the estimated area usage on an IC was less than 250 um². The simulated circuit of this example detected temperatures with 3-sigma accuracy −38.7° C.+/−5.8° C. and 98.5° C.+/−5.8° C. without calibration and −30.2° C.+/−4.6° C. and 94.6° C.+/−3.4° C. after single-temperature calibration at room temperature. However, other embodiments may perform differently.

In one embodiment, calibration of a multi temperature detection circuit can be performed by adjusting the VREF division ratios of a voltage reference circuit used to generate VREF1 and VREF2 with respect to VEB measured at room temperature. In other embodiments, calibration can be performed by adjusting the currents provided by the current sources or by a mix of different approaches.

In one embodiment, a circuit includes a first current path, the first current path including a first transistor having a control terminal to receive a reference voltage and a temperature sensing device. The circuit includes a second current path including a second transistor having a control terminal coupled to a first node of the first current path, the first node of the first current path located between the first transistor and the temperature sensing device. The second current path includes a second node that provides an indication of a detected temperature.

In another embodiment, a circuit includes a first current path, the first current path including a first transistor having a control terminal to receive a reference voltage and a temperature sensing device. The circuit includes a second current path including a second transistor having a control terminal coupled to a first node of the first current path. The first node of the first current path is located between the first transistor and the temperature sensing device. The second current path includes a first current source. The second current path includes a second node located between the second transistor and the first current source that provides an indication of a detected temperature. The first current source is configured to sink current from the second node.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed:

1. A circuit comprising:
   a first current path, the first current path including a first transistor having a control terminal to receive a reference voltage and a temperature sensing device;
   a second current path including a second transistor having a control terminal coupled to a first node of the first current path, the first node of the first current path located between the first transistor and the temperature sensing device;
   wherein the second current path includes a second node that provides an indication of a detected temperature.

2. The circuit of claim 1 wherein the temperature sensing device includes a diode configured bipolar transistor.

3. The circuit of claim 2 wherein the first transistor and the second transistor are characterized as Field Effect Transistors (FET).

4. The circuit of claim 1 further comprising a current source configured to supply a current to both the first current path and the second current path.

5. The circuit of claim 1 further comprising a current source located in the second current path.

6. The circuit of claim 5 wherein the current source is located in the second current path between the second node and ground to sink current from the second node.

7. The circuit of claim 1 further comprising a current source coupled to the first node of the first current path, the current source is selectively enabled when the second node is in a first state so as to provide a hysteresis to the indication of the detected temperature provided by the second node.

8. The circuit of claim 1 wherein the second node indicates that a first temperature is exceeded when a voltage of a first node is less than the reference voltage.

9. The circuit of claim 1 further comprising:
   a third current path including a third transistor having a control terminal coupled to the first node of the first current path, the third current path including a third node indicative of a second detected temperature that is different from the detected temperature.

10. The circuit of claim 9 wherein the second current path includes a first current source for sinking current from the second node and the third current path includes a second current source for sinking current from the third node.

11. The circuit of claim 9 wherein the first current path comprises a fourth transistor, a current terminal of the second transistor of the second current path is coupled to a third node of the first current path located between the first transistor and the fourth transistor.

12. The circuit of claim 11 wherein the fourth transistor includes a control terminal that receives a second reference voltage different than the reference voltage.

13. The circuit of claim 11 further comprising a current source configured to provide current for the first current path, the second current path, and the third current path.

14. The circuit of claim 9 wherein the first current path and the second current path receive sourcing current from a first current source and the third current path receives sourcing current from a second current source.

15. The circuit of claim 14 further comprising:
   a fourth transistor having a first current electrode coupled to a current electrode of the third transistor and a second current electrode coupled to the first node of the first current path, a control terminal of the third transistor coupled to receive a second reference voltage different than the reference voltage.

16. The circuit of claim 9 further comprising:
   a first current source coupled to the first node of the first current path, the first current source is selectively enabled when the second node is in a first state so as to provide a hysteresis to the indication of the detected temperature provided by the second node;
   a second current source coupled to the first node of the first current path, the second current source is selectively enabled when the third node is in a first state so as to provide a hysteresis to the indication of the detected temperature provided by the third node.

17. The circuit of claim 1 further comprising:
   a switched capacitive network, wherein the control terminal of the first transistor receives the reference voltage from a switched capacitor network that samples the reference voltage.

18. The circuit of claim 1 further comprising:
a first current source configured to source a current to both the first current path and the second current path;
a second current source located in the second current path to sink current from the second node, wherein the first current source is configured to source more current than can be sunk by the second current source.

19. The circuit of claim 18 wherein when the second node is in a first voltage state, the second current source is in starvation.

20. The circuit of claim 1 wherein the temperature sensing device includes a diode circuit.

21. A circuit comprising:
a first current path, the first current path including a first transistor having a control terminal to receive a reference voltage and a temperature sensing device;
a second current path including a second transistor having a control terminal coupled to a first node of the first current path, the first node of the first current path located between the first transistor and the temperature sensing device, the second current path including a first current source;
wherein the second current path includes a second node located between the second transistor and the first current source that provides an indication of a detected temperature, the first current source is configured to sink current from the second node.

* * * * *